United States Patent
Schweigert et al.

(10) Patent No.: US 7,338,388 B2
(45) Date of Patent: Mar. 4, 2008

(54) GOLF CLUB HEAD WITH A VARIABLE THICKNESS FACE

(75) Inventors: Bradley D. Schweigert, Anthem, AZ (US); John A. Solheim, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 293 days.

(21) Appl. No.: 11/194,958

(22) Filed: Aug. 1, 2005

(65) Prior Publication Data

US 2006/0063606 A1 Mar. 23, 2006

Related U.S. Application Data

(63) Continuation-in-part of application No. 10/803,837, filed on Mar. 17, 2004.

(51) Int. Cl.
*A63B 53/04* (2006.01)
(52) U.S. Cl. ..................... 473/342; 473/345
(58) Field of Classification Search ............. None
See application file for complete search history.

(56) References Cited

U.S. PATENT DOCUMENTS

| | | | |
|---|---|---|---|
| 4,511,145 A | 4/1985 | Schmidt | |
| 5,954,596 A | 9/1999 | Noble et al. | |
| 6,319,150 B1 | 11/2001 | Werner et al. | |

(Continued)

FOREIGN PATENT DOCUMENTS

GB 2363339 12/2001

(Continued)

OTHER PUBLICATIONS

"Cutting Tool Selection Impacts the Outcome of Hard Metal Machining" by Mike MacArthur, Nov. 2003, viewed online Nov. 23, 2006 (http://www.moldmakingtechnology.com).

*Primary Examiner*—Alvin A. Hunter, Jr.
(74) *Attorney, Agent, or Firm*—Darrell F. Marquette

(57) ABSTRACT

A a golf club head with a variable thickness face plate having a central thickened region surrounded by a transition region tapering from the central thickened region to a thinner peripheral region. The golf club head is made by locating a ball end mill revolving about an axis generally normal to the inner surface of the face plate at an initial location on a circumferential intersection between the outer edge of the central thickened region and a transition region. The inner surface of the face plate is machined by moving the revolving ball end mill in a radial direction outwardly toward and through the transition region and the peripheral region to machine the inner surface of the face plate creating a tool channel having a width as the ball end mill traverses the transition region and thereby vary the thickness of the face plate in the tool path. The ball end mill is then raised in a direction normal to the surface of the face plate and relocated to a subsequent location on the circumferential intersection adjacent to the previous tool channel. The steps of machining, raising and relocating the ball end mill are repeated until the end mill has traversed the entire circumference of the circumferential intersection. In preferred embodiments, the machining step may vary the thickness of the transition region along a variable path, which may be a straight line, a curved line, or any other suitable path.

5 Claims, 4 Drawing Sheets

U.S. PATENT DOCUMENTS

| | | |
|---|---|---|
| 6,354,962 B1 * | 3/2002 | Galloway et al. ............ 473/342 |
| 6,652,391 B1 | 11/2003 | Kubica et al. |
| 6,695,937 B1 | 2/2004 | Stites, III |
| 6,800,038 B2 | 10/2004 | Willett et al. |
| 6,800,039 B1 | 10/2004 | Tseng |
| 6,824,475 B2 | 11/2004 | Burnett et al. |
| 6,881,159 B2 | 4/2005 | Galloway et al. |
| 6,899,638 B2 * | 5/2005 | Iwata et al. ................. 473/329 |
| 6,904,663 B2 | 6/2005 | Willett et al. |
| 7,169,062 B2 * | 1/2007 | Chen ........................... 473/342 |
| 2003/0139227 A1 | 7/2003 | Sugimoto |
| 2004/0083596 A1 | 5/2004 | Willett et al. |
| 2005/0137029 A1 | 6/2005 | Evans et al. |

FOREIGN PATENT DOCUMENTS

| | | |
|---|---|---|
| GB | 2363724 | 1/2002 |
| GB | 2412072 | 9/2005 |
| JP | 2001170227 A * | 6/2001 |
| WO | WO 02/00308 | 1/2002 |

* cited by examiner

GOLF CLUB HEAD WITH A VARIABLE THICKNESS FACE

BACKGROUND OF THE INVENTION

This invention relates generally to golf equipment and, in particular, to a golf club head with a variable thickness face.

Recent developments in golf club design have included improvements in drivers, which are clubs used primarily to strike a golf ball resting on a golf tee. These improvements have resulted in drivers with club heads consisting of a hollow shell usually made of metal, such as steel, aluminum, or titanium. These hollow shells have relatively thin walls including a thin front wall that is used to impact the golf ball. In order to prevent the front wall of these hollow shells from permanently deforming or cracking upon ball impact, it has become necessary to reinforce the front wall. One example of a golf club head consisting of a hollow metal shell with a reinforced front wall is disclosed in U.S. Pat. No. 4,511,145 to Schmidt. The club head disclosed in the Schmidt patent has an arched ridge extending between the heel and toe ends of the front wall. The arched ridge design of the Schmidt provides adequate reinforcement for drivers of moderate head volume, however, in an effort to obtain better and better performance from these hollow metal wood drivers, golf club manufacturers have increased the head volume from the moderate volume of 200 cc's to over 400 cc's during the past decade. As head size increases, less and less material is available to reinforce the front wall of the club face within acceptable weight limitations (i.e., around 200 grams mass). Consequently, more exotic materials such as forged or cold rolled titanium faces welded to a cast titanium body have been utilized in these super-oversized drivers. The rear surfaces of the front walls of these super-oversized drivers must be carefully contoured to provide adequate structural strength with a minimum amount of material.

The most critical region to reinforce the ideal ball impact point of the front wall. Because most golfers' swings vary somewhat from impact to impact, the reinforced region of the front wall must be distributed around the ideal impact point. However, since variations in a golfer's swing tend to be more in the heel and toe direction, rather than up or down, the distribution of hits tends to be within a horizontal, elliptical region rather than a circular region centered around the center of the club face. Accordingly, an elliptical, rather than a purely circular, reinforcement is preferable. One example of a golf club head having a face with a contoured rear surface is U.S. Pat. No. 6,354,962 to Galloway, et al. The club head disclosed in Galloway has a face plate reinforced with elliptical regions that are formed as part of the forging process of the face plate. For clubs in which the club face is machined from a wrought alloy sheet or other sheet material, forming an elliptical reinforced region presents special problems. The face cannot be machined properly on a lathe because the lathe will produce only a circular reinforced region. In addition, removing portions of the club face using a cutter in an elliptical pattern may result in a face that is prone to fatigue cracks.

SUMMARY OF THE INVENTION

According to a first aspect of the present invention, a golf club head is manufactured by removing a portion of the inner surface of a face plate to form a central thickened region surrounded by a transition region that tapers to a thinner peripheral region. According to the illustrative embodiment, the face plate is a rolled sheet titanium alloy between 0.130 and 0.180 inches thick with a portion of the face plate being machined away to form the transition region and the thinner peripheral region.

The golf club face plate is made by locating a ball end mill revolving about an axis generally normal to the inner surface of the face plate at an initial location on a first circumferential intersection between the outer edge of the central thickened region and the transition region. The inner surface of the face plate is machined by moving the revolving ball end mill in a radial direction outwardly toward and through the transition region and the peripheral region to machine the inner surface of the face plate creating a tool channel having a width as the ball end mill traverses the transition region and the peripheral region and thereby vary the thickness of the face insert in the tool channel. The ball end mill is then raised in a direction normal to the surface of the face plate and relocated to a subsequent location on the first circumferential intersection adjacent to the previous tool channel. The steps of machining, raising and relocating the ball end mill are repeated until the end mill has traversed the entire circumference of the circumferential intersection. In preferred embodiments, the machining step may vary the thickness of the transition region from the first thickness to a second thickness. The ball end mill may traverse the transition region along a variable path, which may be a straight line, a curved line, or any other suitable path.

According to another embodiment of present invention, a golf club head including a face insert arranged for impacting a golf ball may be formed. The face insert preferably varies in thickness and includes a central thickened region surrounded by a transition region tapering from the central thickened region to a thinner peripheral region, and a circumferential intersection between the central thickened region and the transition region. The inner surface of the face insert preferably includes a plurality of tool channels formed therein, the plurality of tool channels extending radially outward from the circumferential intersection to an outer edge of the peripheral region.

DESCRIPTION OF THE INVENTION

Figure 1:
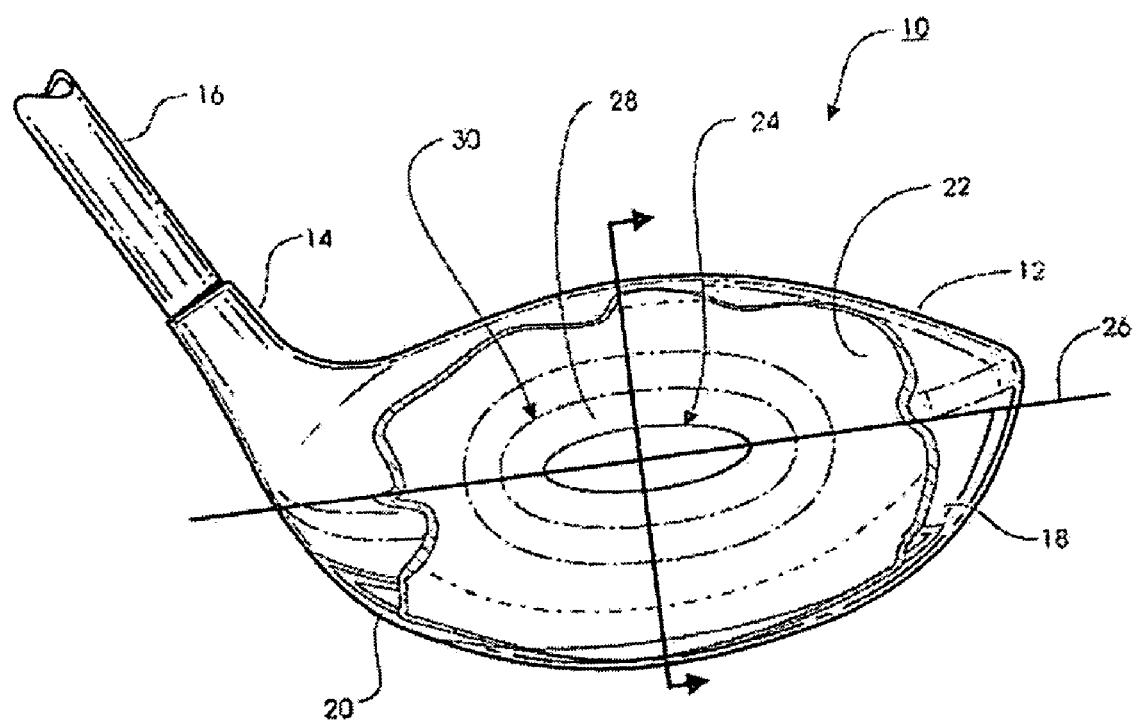
FIG. 1 is a partially cut-away front view of a golf club head according to the present invention.

Referring to FIG. 1, a golf club 10 includes a head 12, a hosel 14 and a shaft 16. Head 12 includes a hollow body 18 made of a metal material such as titanium. Hollow body 18 is formed as a shell 20, which may be assembled from a series of forged pieces but, in the illustrative embodiment, comprises a titanium investment casting. A face plate 22 is attached by conventional means such as plasma or electron beam welding to a corresponding opening 23 (FIG. 2) in shell 20 to form hollow body 18. Face plate 22 may be a conventional forged blank but, in the illustrative embodiment, comprises a rolled sheet titanium blank that is machined prior to welding to shell 20 as described more fully hereinafter.

As noted hereinbefore, because a golfer's swing tends to vary more in the heel-toe direction than it does up or down, the inventor of the present invention determined that the most efficient reinforcement would be a thickened region that is preferably elliptical and oriented so that the major axis of the reinforced region was substantially horizontal when the club head is held in its normal position for addressing the ball. Accordingly, face plate 22 includes a central thickened region 24 that is preferably elliptical in shape with its major axis 26 oriented horizontal when the club is held in its normal address position. In the illustrative embodiment, central thickened region 24 is between 0.130 and 0.180 inches in thickness. Central thickened region 24 is surrounded by a transition region 28 that tapers from the central thickened region 24 to a peripheral region 30, which in the illustrative embodiment is 0.080 to 0.120 inches thick. Transition region 28 is also preferably elliptical, however, for reasons that are explained more fully hereinafter, the major axis and minor axis of transition region 28 are a fixed amount larger than the respective major and minor axis of central thickened region 24. Accordingly, the aspect ratio of transition region 28 is lower than the aspect ratio of central thickened region 24 (in other words, transition region 28 is a "fatter" ellipse than central thickened region 24).

Figure 6:
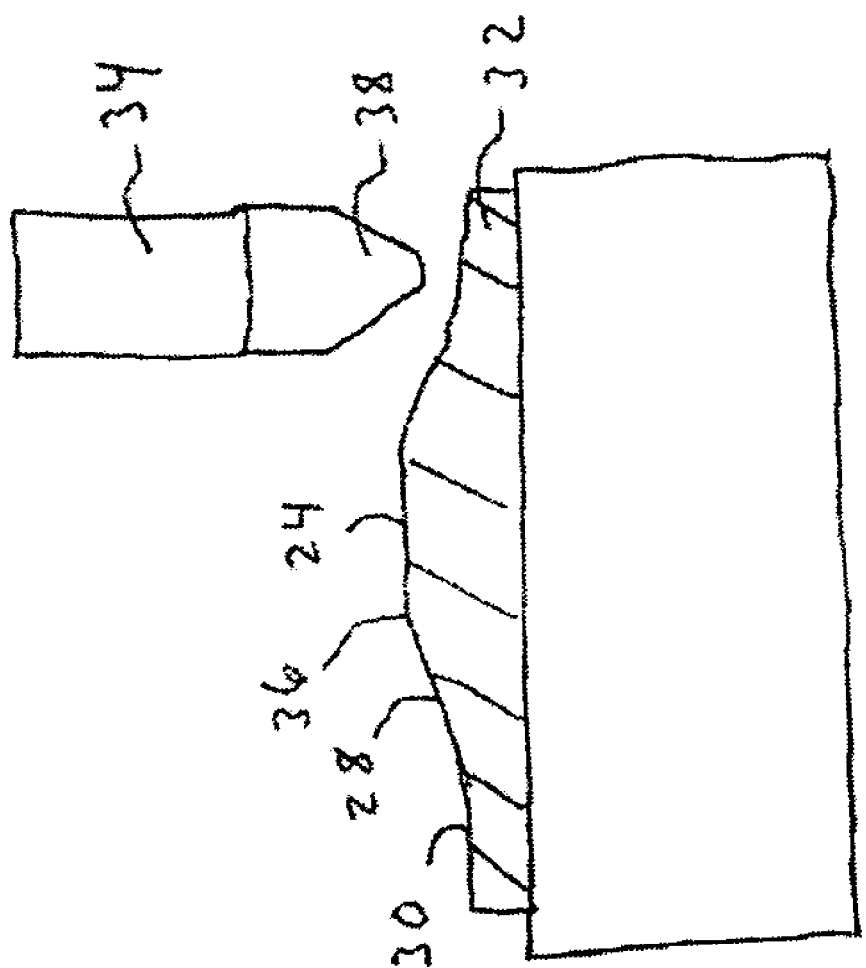
FIG. 6 illustrates the use of a milling machine in a preferred method of the present invention.

With reference to FIGS. 2-6, prior to assembly of face plate 22 to shell 20, the rear contours of the inner surface of face plate 20 are formed by a machining operation shown schematically in FIG. 6. The process begins with a blank face plate 32, which in the illustrative embodiment comprises a blank stamped from a rolled sheet of titanium alloy. The blank face plate 32 has a thickness equal to the final thickness of the central thickened region 24 of the finished face plate 22, which as noted hereinbefore is from 0.130 to 0.180 inches in thickness. The rear or inner surface of blank face plate 32 is machined by using a ball end mill 34 to remove a portion thereof. A revolving ball end mill is located normal to the rear surface of the blank face plate 32 at an initial location on a first circumferential intersection 36 between the outer edge of the thickened region 24 and the transition region 28. As can be seen from FIG. 6, as the lower cutting surface 38 of the ball end mill 34 is brought into contact with rear surface of blank face plate 32, the lower cutting surface 38 begins to cut into rear surface of the blank face plate 32. A tool channel 40 having a width equivalent to the width of the lower cutting surface 38 of the ball end mill 34 is machined into the inner rear surface of the blank face plate 32 by moving the revolving ball end mill 34 in a radial direction outwardly toward and through the transition region 28 and the peripheral region 30. As the ball end mill 34 traverses the transition region 28, the lower cutting surface is gradually moved closer to the rear surface of the blank face plate 32 to thereby vary the thickness of the transition region in the tool channel 40. Preferably, upon reaching a second circumferential intersection 42, located at the intersection of the transition region 28 and the peripheral region 30, the ball end mill 34 does not increase its depth of penetration into the blank face plate 32, thus forming the peripheral region 30 having a constant thickness. The ball end mill 34 may traverse the transition region 28 along various paths including a straight or curved path. Upon reaching the peripheral region 30, the revolving ball end mill 34 is raised in a direction normal to the rear surface of the face plate 32 and moved to a location on the outer edge of the thickened region 24 adjacent to the previous tool channel 40. The process of machining a tool channel 40, raising the ball end mill 34, and relocating the revolving ball end mill to a subsequent location on the elliptical outer edge of the thickened region 24 adjacent to the previous tool channel 40 is repeated until the entire face plate 22 is formed. The movement of the ball end mill 34 during formation of the face plate 22 may be computer controlled. In a preferred embodiment, the process of forming the face plate 22 results in about 95% of the surface area of the rear surface of the blank face plate 32 being machined, with about 25% of the volume of the face plate 32 removed.

Figure 2:
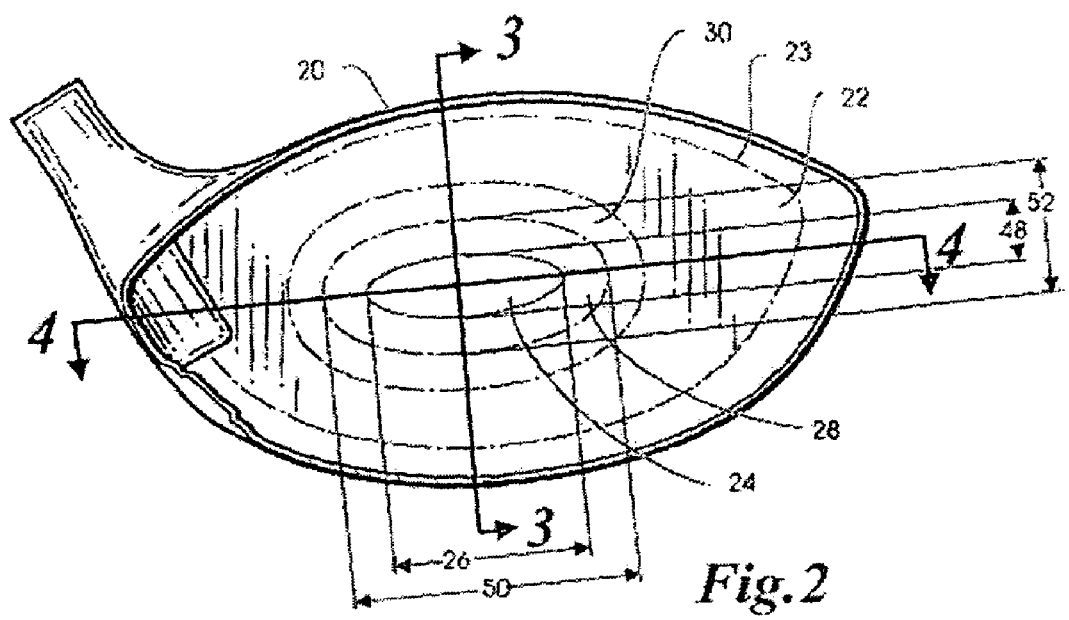
FIG. 2 is a rear cross-sectional view of the golf club head of FIG. 1.
Figure 3:
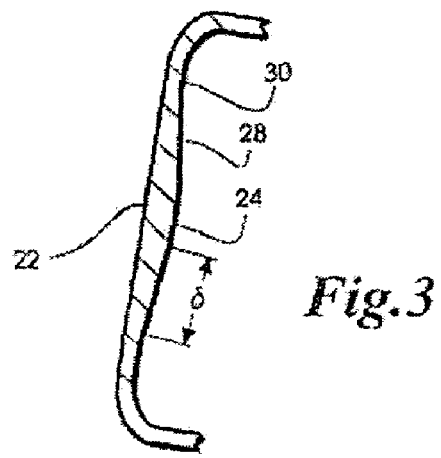
FIG. 3 is a cross-sectional view of the golf club head taken along lines 3-3 in FIG. 2.
Figure 4:
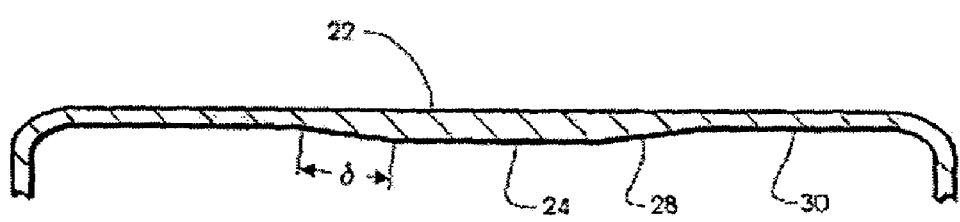
FIG. 4 is a cross-sectional view of the golf club head of taken along line 4-4 in FIG. 2.
Figure 5:
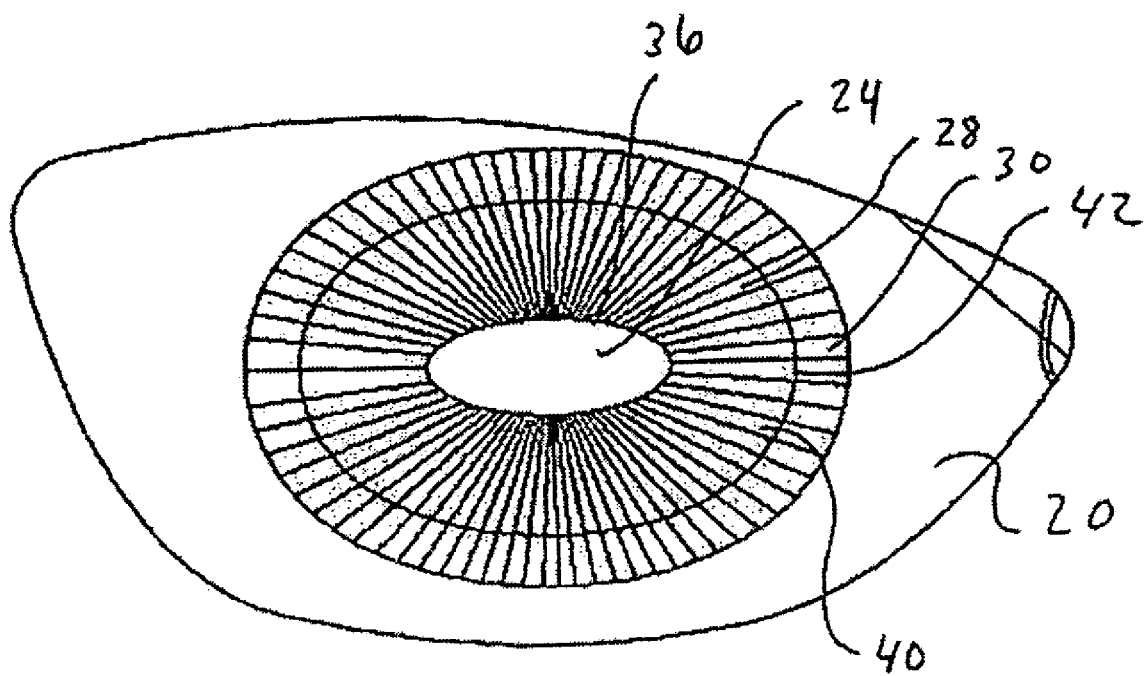
FIG. 5 is a another rear cross-sectional view of the golf club head of FIG. 1.

With particular reference to FIGS. 2-4, the major axis 26 of central thickened region 24 is from 0.65 to 1.05 inches in length. The minor axis 48 of central thickened region 24 is 0.25 to 0.45 inches in length. Accordingly, the aspect ratio of central thickened region 24 is between 1.4 and 4.2. In the illustrative embodiment, major axis 26 is approximately 0.85 inches and minor axis 48 is approximately 0.35 inches yielding an aspect ratio of approximately 2.4.

Major axis 50 and minor axis 52 of transition region 28 are a fixed amount "δ" greater than the respective major and minor axes of central thickened region 24. In the illustrative example, the major axis 50 and minor axis 52 are approximately 0.86 inches greater than the respective major and minor axes of central thickened region 24. Thus, major axis 50 in the illustrative embodiment is approximately 1.71 inches in length and minor axis 52 of transition region 28 is approximately 1.21 inches in length. Thus, the aspect ratio of transition region 28 is approximately 1.4 as opposed to the 2.4 aspect ratio of central thickened region 24. The high aspect ratio central raised portion surrounded by the lower aspect ratio transition region provides optimum distribution of material for improved performance and reliability.

The use of a ball end mill to surface machine the inner surface of the face plate by creating tool channels in a radial direction improves the fatigue strength and promotes better face durability because the tool channels are perpendicular to the direction that a fatigue crack generally forms. Although certain illustrative embodiments and methods have been disclosed herein, it will be apparent from the foregoing disclosure to those skilled in the art that variations and modifications of such embodiments and methods may be made without departing from the spirit and scope of the invention. Accordingly, it is intended that the invention should be limited only to extent required by the appended claims and the rules and principals of applicable law.

What is claimed is:

1. A golf club head comprising:
    a face insert arranged for impacting a golf ball, the face insert having an inner surface and an outer surface;
    the face insert varying in thickness and having a central thickened region surrounded by a transition region tapering from the central thickened region to a thinner peripheral region, a first circumferential intersection between the thickened region and the transition region, and a second circumferential intersection between the transition region and the peripheral region;
    the inner surface of the face insert having a plurality of tool channels formed therein, the plurality of tool channels extending radially outward from the first circumferential intersection toward and through the transition region and the peripheral region;
    the first circumferential intersection having a first major axis and a first minor axis;

the second circumferential intersection having a second major axis and a second minor axis, the second major axis being equal to the first major axis plus a predetermined distance and the second minor axis being equal to the first minor axis plus said predetermined distance; and the first major axis being from 0.65 to 1.05 inches and the first minor axis being from 0.25 to 0.45 inches.

2. The golf club head of claim 1, wherein the tool channels extend along a straight line outwardly toward and through the transition region and the peripheral region.

3. The golf club head of claim 1, wherein the tool channels extend along a curved line outwardly toward and through the transition region and the peripheral region.

4. The golf club head of claim 1, wherein the predetermined distance is from 0.40 to 1.20 inches.

5. The golf club head of claim 1, further comprising a shell having an opening and the face plate being attached to the opening in the shell to form a hollow body.

* * * * *

UNITED STATES PATENT AND TRADEMARK OFFICE
CERTIFICATE OF CORRECTION

| | | |
|---|---|---|
| PATENT NO. | : 7,338,388 B2 | Page 1 of 1 |
| APPLICATION NO. | : 11/194958 | |
| DATED | : March 4, 2008 | |
| INVENTOR(S) | : Schweigert et al. | |

It is certified that error appears in the above-identified patent and that said Letters Patent is hereby corrected as shown below:

Title page, under "Related U.S. Application Data", in field (63), delete "Continuation-in-part of application No. 10/803,837, filed on Mar. 17, 2004.".

Title page, item [57] under "Abstract", line 1, after "A" delete "a".

Signed and Sealed this

First Day of December, 2009

David J. Kappos
*Director of the United States Patent and Trademark Office*